(12) United States Patent
Song (10) Patent No.: US 6,694,019 B1
(45) Date of Patent: Feb. 17, 2004

(54) METHOD AND APPARATUS FOR INFINITE RETURN LOSS HANDLER FOR NETWORK ECHO CANCELLER

(75) Inventor: Wei-jei Song, Aliso Viejo, CA (US)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/383,867

(22) Filed: Aug. 26, 1999

(51) Int. Cl.[7] ............................................. H04M 9/08
(52) U.S. Cl. ........................ 379/406.04; 379/406.05; 379/406.08; 379/406.12
(58) Field of Search ................... 379/390.02, 388.07, 379/390.04, 394, 399.01, 406.01, 406.04, 406.05, 406.06, 406.12

(56) References Cited

U.S. PATENT DOCUMENTS

| | | | | |
|---|---|---|---|---|
| 5,247,512 A | * | 9/1993 | Sugaya et al. | 370/32.1 |
| 5,283,784 A | * | 2/1994 | Genter | 370/288 |
| 5,386,465 A | * | 1/1995 | Addeo et al. | 379/202 |
| 5,434,916 A | * | 7/1995 | Hasegawa | 379/406.02 |
| 5,577,097 A | * | 11/1996 | Meek | 379/3 |
| 5,646,991 A | * | 7/1997 | Sih | 379/410 |
| 5,809,463 A | * | 9/1998 | Gupta et al. | 704/233 |
| 6,031,908 A | * | 2/2000 | Laberteaux et al. | 379/406.09 |
| 6,195,430 B1 | * | 2/2001 | Eriksson et al. | 379/406.05 |
| 6,219,418 B1 | * | 4/2001 | Eriksson et al. | 379/406.08 |
| 6,347,140 B1 | * | 2/2002 | Tahernezhaadi et al. | 379/406.01 |
| 6,351,531 B1 | * | 2/2002 | Tahernezhaadi et al. | 379/401.01 |
| 6,434,110 B1 | * | 8/2002 | Hemkumar | 370/201 |
| 6,504,838 B1 | * | 1/2003 | Kwan | 370/352 |
| 6,549,587 B1 | * | 4/2003 | Li | 375/326 |

* cited by examiner

*Primary Examiner*—Binh Tieu
(74) *Attorney, Agent, or Firm*—Blakely Sokoloff Taylor & Zafman LLP (57) ABSTRACT

A communication device and method for detecting an infinite return loss (IRL) condition and temporarily halting or bypassing operations of an echo canceller in response to detecting that condition. The echo canceller includes an IRL detection module that analyzes the echo return loss and the echo return loss enhancement measured from the far-end and near-end signals. Based on the analysis, the IRL detection module determines whether to bypass the subtraction of the estimated echo in the outgoing near-end signal or continue normal operations.

17 Claims, 6 Drawing Sheets

METHOD AND APPARATUS FOR INFINITE RETURN LOSS HANDLER FOR NETWORK ECHO CANCELLER

BACKGROUND

1. Field

The present invention relates to the field of communications. In particular, this invention relates to a communication device and method for detecting an infinite return loss condition and bypassing or temporarily halting operations of an echo canceller in response thereto.

2. General Background

During a two-way telephone conference, a caller sometimes can hear his or her own voice as a delayed echo. This phenomenon is referred to as "talker echo". One cause for talker echo is the presence of signal reflections in a transmission path. Often, signal reflections occur at hybrid circuits. Generally speaking, a hybrid circuit is a transformer circuit that is designed for coupling together different types of transmission lines. It is commonplace for voice-based communication networks to be implemented with different types of transmission lines, and thus, necessities the need for echo cancelling techniques to mitigate or eliminate talker echo caused by signal reflections.

Besides talker echo, acoustic echo is an inherent problem in wireless handsets or headsets. The reason is that typical handsets and headsets continuously maintain their speaker (or earphone) and microphone in an active state. This creates an acoustic coupling between the speaker (or earphone) and the microphone. In addition, when applicable, acoustic echo may be caused by crosstalk in the handset or headset cord. Thus, echo cancellation techniques are also used to mitigate the effects of acoustic coupling.

Typically, echo cancellers are used to reduce or eliminate any type of echo. For example, to reduce echo caused by either signal reflections from a hybrid circuit or acoustic coupling, an echo canceller (i) simulates an estimated echo, and (ii) subtracts the estimate echo from outgoing voice data. During an "infinite return loss" (IRL) condition, however, the operations of conventional echo cancellers tend to create echo rather than reducing or eliminating echo. An IRL condition exists when the signal level of an incoming far-end signal exceeds the signal level of an outgoing near-end signal (including echo from hybrid reflection or acoustic coupling) by a substantial decibel level (e.g., forty or more decibels "dB"). For example, an IRL condition would likely occur with termination on a four-wire terminal device such as an Internet Protocol (IP) phone, in which case the echo canceller of the switching device effectively applies additional echo (e.g., the estimated echo) to the outgoing signal.

Hence, it would be desirable to provide a device and method that prevents unwanted echo from being generated when the IRL condition is identified. Also, it would be desirable to identify the IRL condition by monitoring signal levels associated with both an echo return loss (ERL) and an echo return loss residue (ERLE) threshold values. This avoids relying on computations based solely on delayed signals reflected from a hybrid circuit that can cause errand detection of the IRL condition.

SUMMARY

Briefly, the present invention relates to a communication device and method for detecting an infinite return loss (IRL) condition and either bypassing or temporarily halting operations of an echo canceller during this condition. This avoids the generation of unwanted echo. In one embodiment, the IRL condition is detected through analysis of both an echo return loss (ERL) and an echo return loss enhancement (ERLE). This improves reliability over conventional IRL condition computations because the IRL condition is not detected through computations based solely on delayed signals reflected from a hybrid circuit. This allows for better reliability and audio quality.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

The features and advantages of the present invention will become apparent from the following detailed description of the present invention in which.

DETAILED DESCRIPTION

Herein, embodiments of the present invention relate to a communication device and method for detecting an infinite return loss (IRL) condition and bypassing or temporarily halting operations of an echo canceller during this condition in order to avoid generating unwanted echo.

Herein, certain terminology is used to describe various features of the present invention. In general, a "network" comprises two or more communication devices coupled together through transmission lines. A "communication device" is broadly defined as hardware and/or software with echo cancellation functionality. Examples of a communication device include but are not limited or restricted to the following: (1) a switch including an echo canceller that transfers information over a network, and/or (2) a terminal including an echo canceller that functions as an originator or targeted destination of the information (e.g., a packet voice terminal such as a computer or a set-top box supporting telephony, a digital telephone, a cellular phone, etc.). "Information" includes audio such as voice signals, music signals and/or any other audible sounds.

As further described herein, a "transmission line" includes any medium capable of transmitting information at some ascertainable bandwidth. Examples of a transmission line include a variety of mediums such as twisted pair lines, coaxial cable, optical fiber lines, wireless communication channels using satellite, microwave, or radio frequency, or even a logical link. An "echo canceller" is hardware and/or software that mitigates or eliminates echo signals present on a transmission path due to a variety of factors such as signal reflections. In one embodiment, the echo canceller includes software executable by a processor (e.g., a digital signal processor, a general microprocessor, a controller, a state machine and the like). However, it is contemplated that the echo canceller may include dedicated circuitry with no software execution capabilities.

Figure 1:
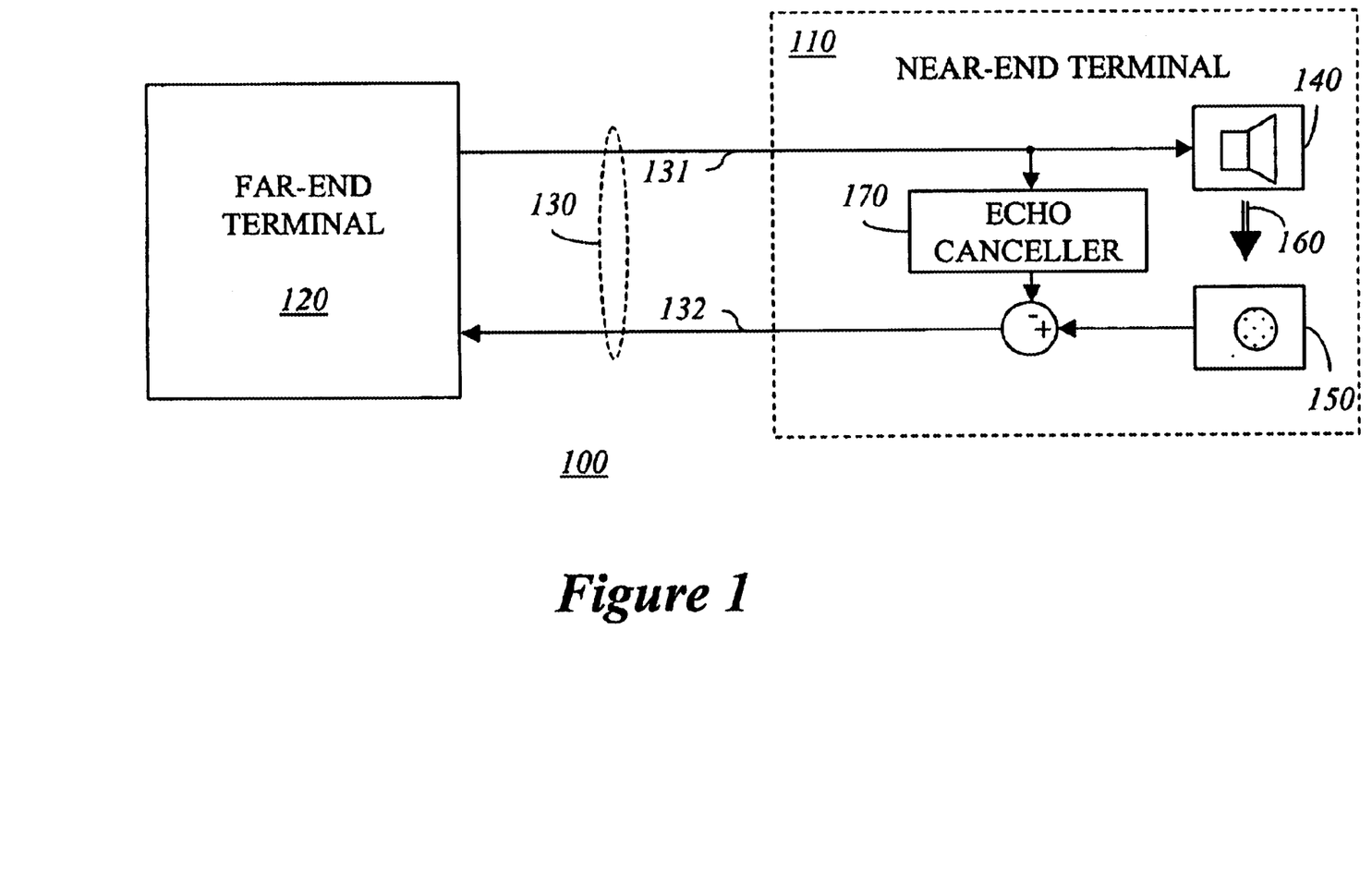
FIG. 1 is a block diagram of a first illustrative embodiment of a network employing one type of communication device having an echo canceller.

Referring to FIG. 1, a block diagram of a first illustrative embodiment of a network 100 employing an echo canceller to mitigate acoustic echo is shown. Network 100 comprises a near-end terminal 110 coupled to a far-end terminal 120 over a bi-directional transmission path 130. In particular, near-end terminal 110 includes a speaker 140 and a microphone 150 coupled to a pair of transmission lines 131 and 132, which form a bi-directional transmission path 130. The acoustic coupling between speaker 140 and microphone 150 creates an echo path 160 over the air. Thus, an echo canceller 170 is employed within near-end terminal 110 and coupled to transmission lines 131 and 132 to analyze echo characteristics of outgoing information (e.g., near-end audio signals) returned to far-end terminal 120 accompanied by incoming audio and/or comfort noise from near-end terminal 110.

Figure 2:
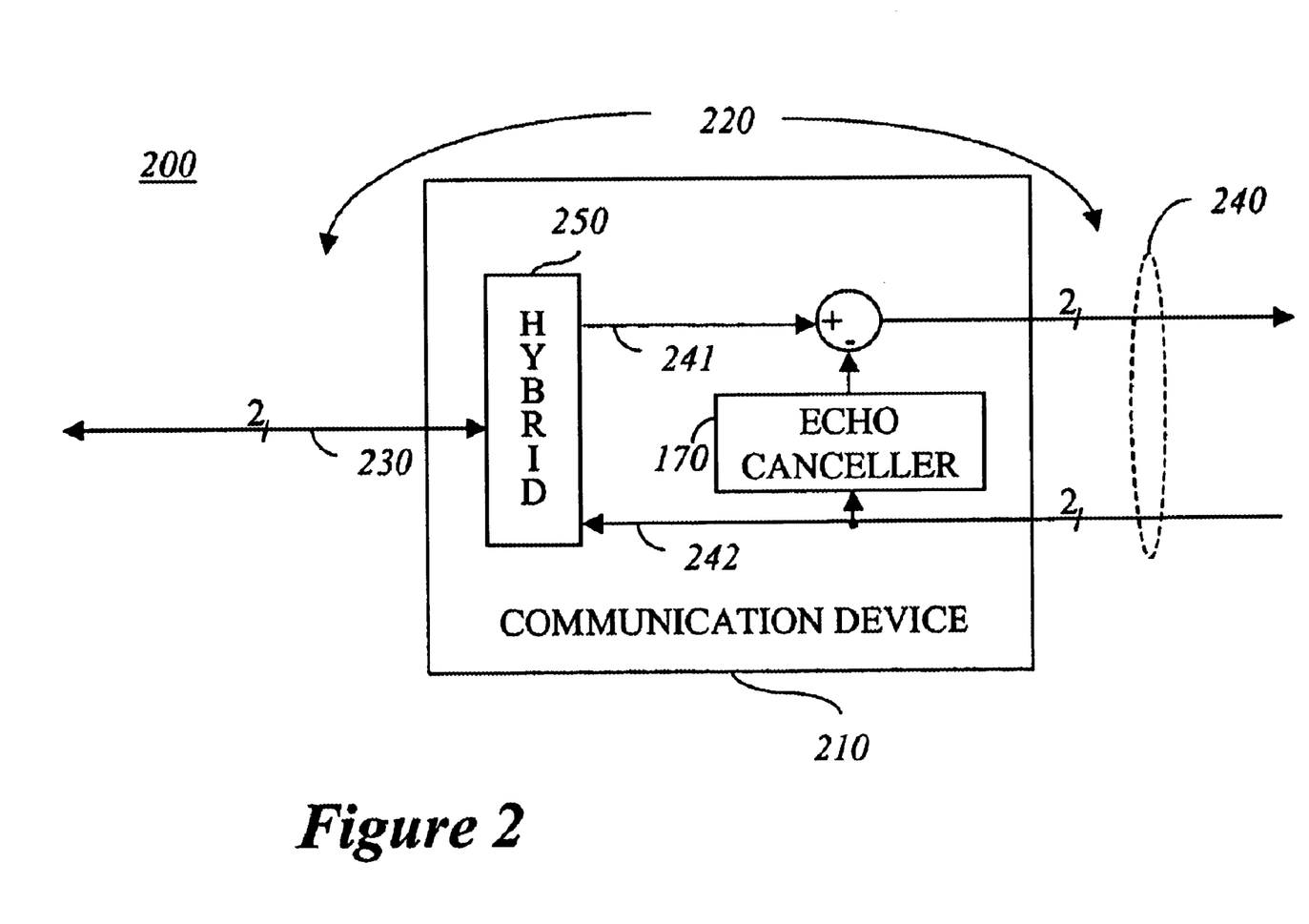
FIG. 2 is a block diagram of a second illustrative embodiment of a network employing another type of communication device having an echo canceller is shown.

Referring now to FIG. 2, a block diagram of a second illustrative embodiment of a network 200 employing a communication device 210 having echo canceller 170 is shown. Herein, communication device 210 provides transmission path 220 for incoming and outgoing audio signals. In this embodiment, transmission path 220 partially includes a two-wire "local" transmission line 230 (e.g., twisted pair) coupled to a long-distance (four-wire) "trunk" transmission line 240 for example. As shown, trunk transmission line 240 includes a pair of separated two-wire transmit (TX) and receive (RX) lines 241 and 242.

As shown, echo canceller 170 mitigates echo returned from incoming far-end audio signals over transmission line 242. The echo may be a result of signal reflections caused by a hybrid circuit 250, situated in communication device 210, that is designed to couple together transmission lines 230 and 240. Alternatively, the echo may be caused by unbalanced impedance(s) from switch(es) along transmission path 220, although reflections from hybrid circuit 250 usually provide a dominant portion of the echo.

Figure 3:
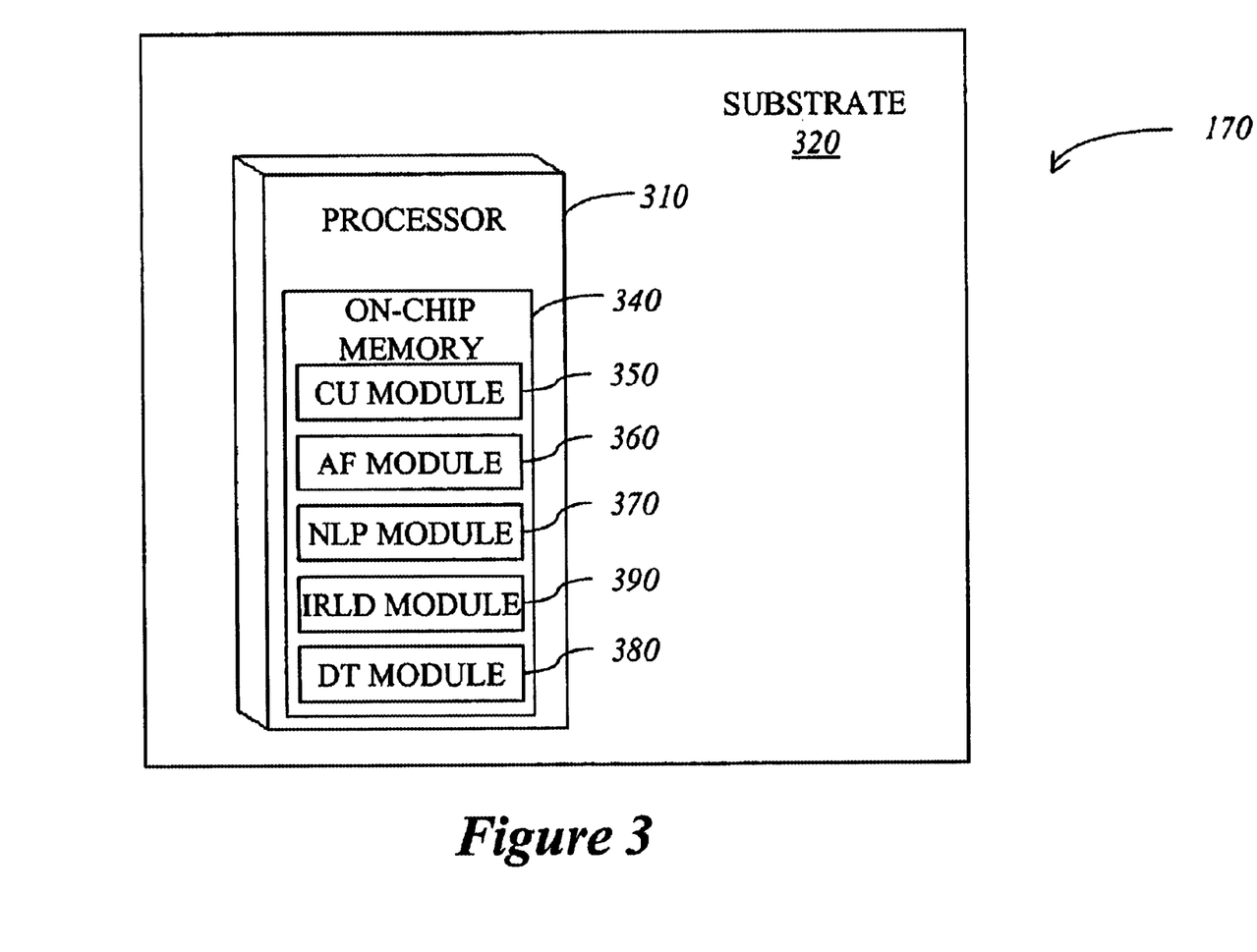
FIG. 3 is a block diagram of an embodiment of the echo canceller employed within the communication device of FIG. 1 or FIG. 2.

Referring now to FIG. 3, a block diagram of an embodiment of an echo canceller 170 employed within any communication device (e.g., a near-end terminal 110 of FIG. 1 or a switch 210 of FIG. 2) is shown. In this embodiment, echo canceller 170 comprises a processor 310 coupled to a substrate 320 formed with any type of material or combination of materials upon which integrated circuit (IC) devices can be attached. Examples of substrate 320 include a daughter card, a network card, a motherboard and the like.

Processor 310 includes, but is not limited or restricted to a digital signal processor, a general purpose microprocessor, a micro-controller or any other logic having software processing capabilities. Processor 310 includes an on-chip memory 340 to store echo cancellation software, samples of audio signals and coefficients corresponding to the audio samples. "Coefficients" are computed values that are used in connection with samples of audio signals to calculate an estimated echo and minimize residual echo. Each coefficient may be computed as a normalized least mean square value as shown in equation (A):

$$h_k(n)=h_k(n-1)+(\beta^*x(n-k)^*e(n))/|x|^2 \qquad (A)$$

where: "$\beta$" is a constant (step size),

"x(n−k)" is a delayed version of the current audio sample for sequence "x", "e(n)" is the current residual echo, and "x" is the energy associated with the average incoming audio signal $x_n$.

The software executable by processor 310 comprises a coefficient update (CU) module 350, an adaptive filter (AF) module 360, nonlinear processor (NLP) module 370, a double talk detection (DTD) module 380 and an infinite return loss detection (IRLD) module 390. Of course, for relaxed timing constraints, some or all of these modules 350, 360, 370, 380 and 390 may be stored in off-chip memory. The general operations of these modules 350, 360, 370, 380 and 390 are described in FIG. 4.

Thus, processor 310 operates as an echo canceller. It is contemplated, however, that other embodiments for echo cancellers may be implemented in lieu of a software-based processor implementation. For example, echo canceller 170 may be implemented with programmable logic or even combinatorial logic to perform the operations associated with adaptive filtering, summing and IRL detection.

Figure 4:
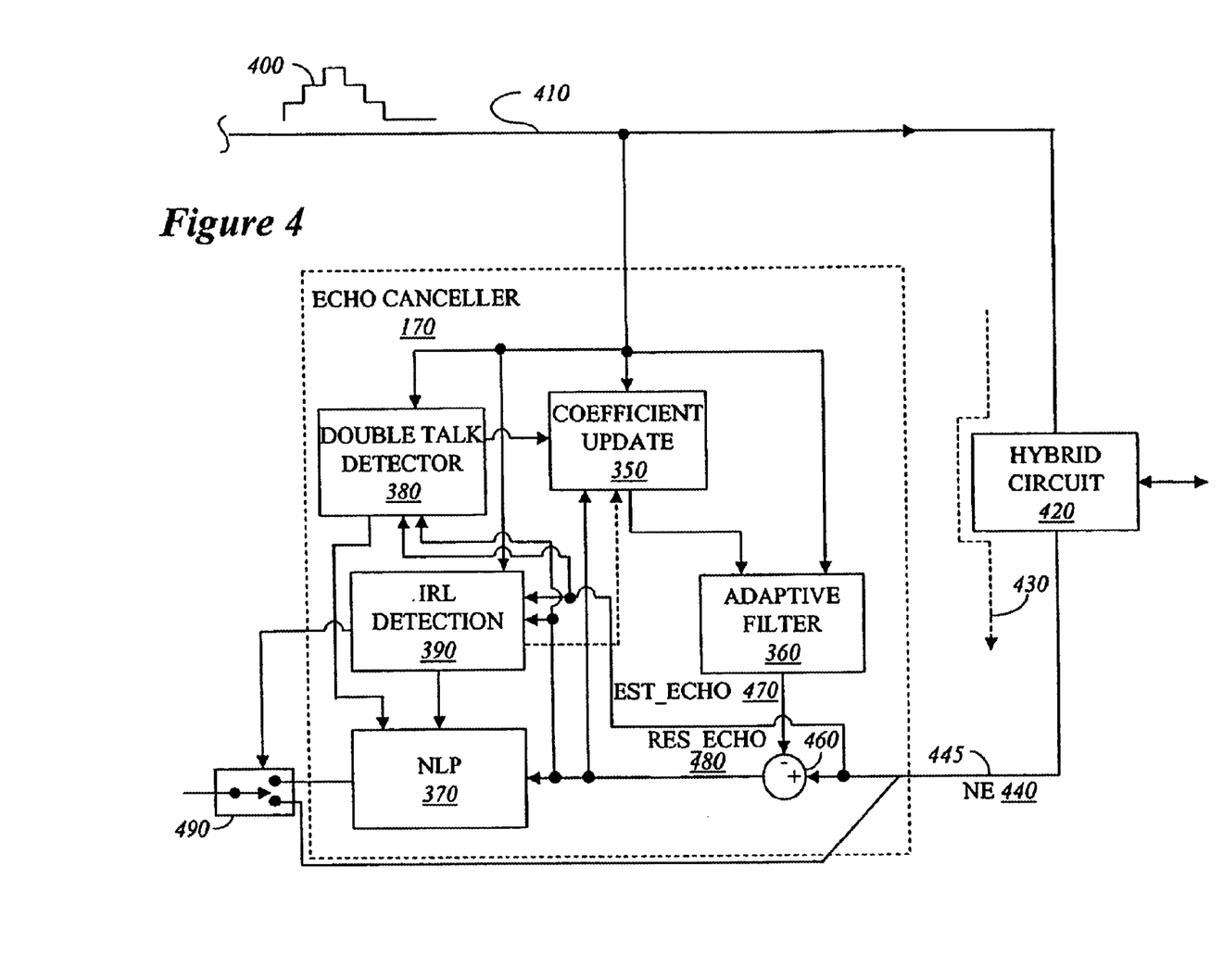
FIG. 4 is a block diagram of an embodiment featuring general echo cancellation operations performed by a processor of FIG. 3.

Referring now to FIG. 4, a block diagram of an embodiment featuring general echo cancellation operations performed by processor 310 of FIG. 3 is shown. A far-end signal 400 (e.g., audio) is digitized before being transferred through one or more receive (RX) transmission lines 410. In this embodiment, a hybrid circuit 420 causes signal reflections to propagate over an echo path 430 so that echo is now present with a near-end (NE) signal 440 on transmit (TX) transmission lines 445. NE signal 440 may include echo caused by signal reflections from hybrid circuit (referred to as the "echo"). NE signal 440 is provided to a summing circuit 460 and a virtual switch 490 controlled by IRL detection module 390. This determines whether to output (i) signaling from NLP module 370 or (ii) NE signal 440 bypassing echo canceller 170 altogether.

Concurrent to the above-described operations, coefficient update module 350 initially computes coefficients based on far-end signal 400 and prior coefficient in order to more accurately estimate the echo path. These coefficients are provided to adaptive filter module 360.

Adaptive filter module 360 performs arithmetic operations based on both the coefficients provided by coefficient update module 350 and sampled far-end signal 400 to produce an estimated echo (EST_ECHO) 470. EST_ECHO 470 is made negative and loaded into summing circuit 460. Thus, EST_ECHO 470 is subtracted from NE signal 440. The remaining echo is referred to as residual echo (RES_ECHO) 480.

NLP module 370 is software that, upon execution, suppresses (or removes) RES_ECHO by clipping an output signal at amplitudes below a preset, constant or adaptive clipping amplitude threshold. Alternatively, NLP module 370 may be designed so that the clipping amplitude threshold is dynamically adjusted as described in a co-pending United States Patent Application entitled "Adaptive Nonlinear Processor For Echo Cancellation" (application Ser. No. 09/190,377).

A "double talk" condition occurs when audio is simultaneously transmitted between the far-end terminal and the near-end terminal. For example, two callers are talking at the same time. Upon detection of a double talk condition, DTD module 380 disables NLP module 370 and coefficient update module 350 to avoid any coefficient updates for that cycle and many cycles that follow for "hangover".

Figure 5:
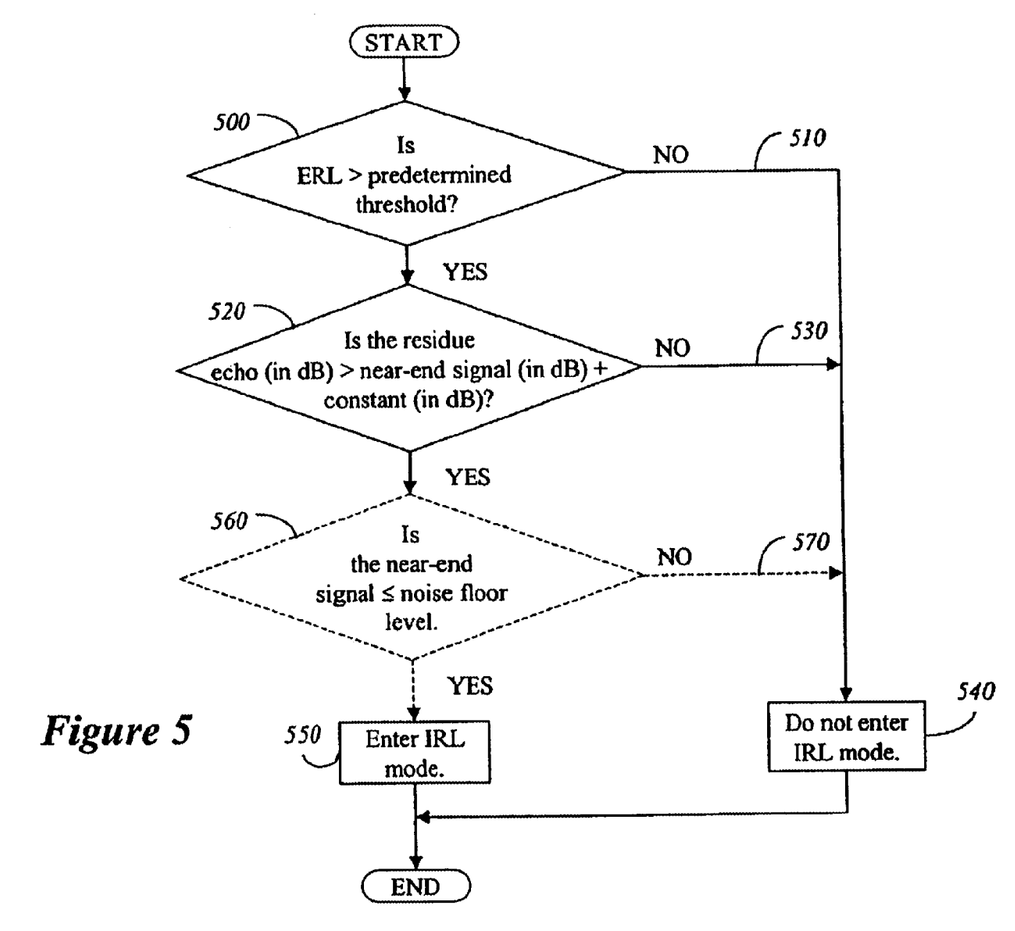
FIG. 5 is a flowchart of an illustrative embodiment of operations of the echo canceller in determining whether or not to place the communication device in an infinite return loss (IRL) mode.

IRL detection module 390 places the communication device in an IRL mode upon detecting the existence of an IRL condition as described in FIG. 5. When placed into the IRL mode, virtual switch 490 is set to bypass the echo canceller altogether and avoid adjustment of NE signal 440. As an alternative embodiment, in lieu of employing virtual switch 490, the coefficients associated with coefficient update module 350 may be set to zero during the IRL mode and released upon exiting the IRL mode as represented by dashed control lines.

In general, IRL detection module 390 analyzes at least the echo return loss (ERL) and the echo return loss enhancement (ERLE) to determine whether an IRL condition exists. "ERL" is equivalent to an average difference between the amplitude levels of far-end signal 400 (FE) and near-end signal 440 (NE). "ERLE" is a ratio between (i) an average amplitude level of NE signal 440 prior to being input into summing circuit 460, and (ii) an average amplitude level of RES_ECHO 480 after removal of EST_ECHO 470. Thus, ERL (in dB) and ERLE (in dB) may be calculated as shown in equations (B) and (C).

$$ERL(\text{in dB}) = 20\ \log_{10}(FE_{ave}/NE_{ave}),\ \text{where} \qquad (B)$$

$$FE_{ave} = (1-\mu_1) \times FE_{ave} + \mu_1 \times |FE_{current}|,\ 0 < \mu_1 < 1;$$
$$NE_{ave} = (1-\mu_2) \times NE_{ave} + \mu_2 \times |NE_{current}|,\ 0 < \mu_2 < 1.$$

$$ERLE(\text{in dB}) = 20\ \log_{10}(NE_{ave}/RES_{ave}),\ \text{where} \qquad (C)$$

$$RES_{ave} = (1-\mu_3) \times RES_{ave} + \mu_3 \times |RES\_ECHO|,\ 0 < \mu_3 < 1.$$

Figure 6:
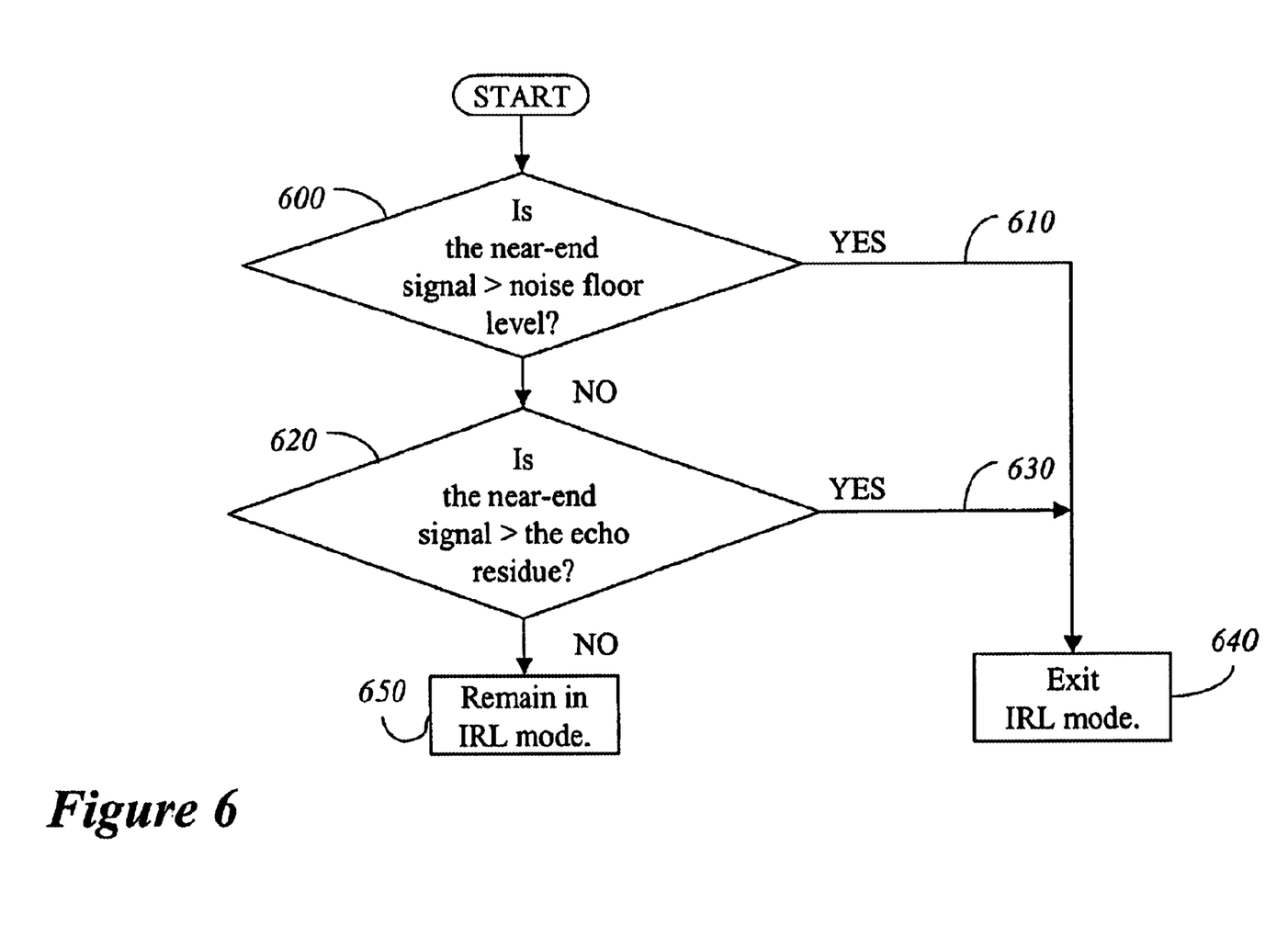
FIG. 6 is a flowchart of an illustrative embodiment of the operations of the echo canceller in determining whether or not to remove the communication device from the IRL mode.

IRL detection module 390 also analyzes the signal level of NE signal 440 to determine whether or not the communication device can be removed from the IRL mode as described in FIG. 6.

Referring to FIG. 5, a flowchart of an illustrative embodiment of operations of the echo canceller in determining whether to place the communication device into an infinite return loss (IRL) mode are shown. As shown in block 500, when receiving one or more far-end signals, IRL detector determines whether a level difference (in dB) between the far-end signal and the near-end signal (collectively equal to ERL) is greater than a predetermined threshold. The predetermined threshold is set ranging from 35 dB and higher. It is contemplated that a decibel range above 40 dB is likely chosen in order to remove reliability and reduce the susceptibility of false detection. If the ERL is less than or equal to the predetermined threshold, the communication device does not enter IRL mode (block 510).

However, if ERL is greater than the predetermined threshold, the residue echo (in dB) is compared with the combination of the near-end signal (in dB) and a predetermined constant (in dB) as shown in block 520. This determines whether the near-end signal is diverging which would occur when the echo canceller is in the IRL mode. Herein, the predetermined constant is selected to approximately range between eight and twelve decibels inclusive. If the residue echo is less than or equal to the combination, the near-end signal is not diverging from the true hybrid response so that the communication device does not enter into the IRL mode (block 530). However, if the residue echo is greater than the combination, the communication device enters into the IRL mode (block 540).

As shown in FIG. 5, as an option, a third condition may be analyzed to determine whether the communication device is operating in an IRL condition. In particular, IRL detection module compares the amplitude level of the near-end signal with a noise floor level (block 550). The "noise floor level" is equivalent to a minimum decibel threshold level where echo cancellation using the near-end signal is highly inaccurate. For example, the noise floor level may range between −50 decibel power levels (dBm0) and −65 dBm0 or even lower. If the near-end signal is greater than the noise floor level, the communication device does not enter into the IRL mode (block 560). Otherwise, the communication device enters into the IRL mode (block 570).

Referring now to FIG. 6, a flowchart of an illustrative embodiment for removal of a communication device from the IRL mode is shown. Initially, the amplitude level of the near-end signal is compared with the noise floor level (block 600). If the amplitude level exceeds the noise floor level, the communication device is removed from the IRL mode (block 610). Otherwise, the amplitude level of the near-end signal is compared with the echo residue (block 620). If the amplitude level exceeds the echo residue, the communication device is removed from the IRL mode (block 630). Otherwise, the communication device remains in the IRL mode (block 640).

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art. For example, the invention can be applied to acoustic echo cancellation.

What is claimed is:

1. A method for handling an infinite return loss condition, comprising:
   analyzing an echo return loss value by (i) computing a decibel level of an incoming far-end signal, (i) computing a decibel level of an outgoing near-end signal, and (iii) computing a difference between the far-end signal and the near-end signal to produce the echo return loss value;
   analyzing an echo return loss enhancement value by comparing a residue echo with an amplitude of the near-end signal and a selected decibel value; and
   bypassing echo cancellation operations if the infinite return loss condition is detected after analysis of the echo return loss value and the echo return loss enhancement value.

2. The method of claim 1, wherein the analysis of the echo return loss value further includes comparing the echo return loss value with a predetermined threshold value, the predetermined threshold value ranges from at least thirty-five decibels and higher.

3. The method of claim 2, further comprising
   performing echo cancellation operation on the near-end signal if the echo return loss value is less than the predetermined threshold value.

4. The method of claim 1, wherein the analysis of the echo return loss value includes:
   comparing the echo return loss value with a predetermined threshold value being at least thirty-five decibels; and
   performing an analysis of the echo return loss enhancement value if the echo return loss value is greater than the predetermined threshold value.

5. The method of claim 1 further comprising performing the echo cancellation operations on the near-end signal if the residue echo is less than or equal to the amplitude of the near-end signal at the selected decibel value.

6. The method of claim 1, wherein the analysis of the echo return loss enhancement value includes:

comparing the residue echo with the amplitude of the near-end signal and the selected decibel value; and determining that the infinite return loss condition is existent when the echo return loss enhancement value is greater than the predetermined threshold value.

7. The method of claim 1 further comprising:

performing echo cancellation operations if no infinite return loss condition is detected.

8. The method of claim 1, wherein the selected decibel value is within a range of eight decibels to twelve decibels.

9. A communication device comprising:

a processor; and a memory coupled to the processor, the memory to contain an infinite return loss detection module which, when executed by the processor, (1) detects an infinite return loss condition by comparing an echo return loss value, including a signal level difference between a far-end signal incoming into the communication device and a near-end signal outgoing from the communication device, with a predetermined threshold value and comparing a residue echo with a combination of an amplitude of the near-end signal and a selected decibel value if the echo return loss value is greater than the predetermined threshold value, (2) signals the processor to temporarily bypass echo cancellation operations when the infinite return loss condition is detected, and (3) fails to detect the infinite return loss condition if an echo return loss enhancement value is less than or equal to the predetermined threshold value.

10. The communication device of claim 9, wherein the memory includes on-chip memory associated with the processor.

11. The communication device of claim 9, wherein the infinite return loss detection module (i) compares the echo return loss value with a predetermined threshold value, and (ii) fails to detect the infinite return loss condition if the echo return loss value is less than the predetermined threshold value.

12. The communication device of claim 9, wherein the predetermined threshold value ranges from at least thirty-five decibels and higher.

13. A communication device comprising:

a processor; and a memory coupled to the processor, the memory to contain an infinite return loss detection module which, when executed by the processor, (1) detects an infinite return loss condition by comparing an echo return loss value, including a signal level difference between a far-end signal incoming into the communication device and a near-end signal outgoing from the communication device, with a predetermined threshold value being at least thirty-five decibels, comparing a residue echo with a combination of an amplitude of the near-end signal and a selected decibel value if the echo return loss value is greater than the predetermined threshold value.

14. A medium having embodied thereon a program for processing by a communication device, the program comprising:

an adaptive filter module to compute an estimated echo to be subtracted from echo associated with a near-end signal; and an infinite return loss detection module to determine whether an infinite return loss condition exists by determining whether an echo return loss, a signal level difference between a front-end signal with the near-end signal, is greater than a predetermined audio threshold and whether a residue echo, being a difference between the amplitude of the near-end signal and an estimated echo is greater than the amplitude of the near-end signal with a predetermined constant.

15. A method for handling an infinite return loss (IRC) condition, comprising:

determining a noise floor level;

determining if an amplitude of a near-end signal sent over a transmission line is greater than the noise floor level; and bypassing echo cancellation operations if the amplitude of the near-end signal is less than the noise floor level.

16. The method of claim 15, further comprising:

performing echo cancellation operation if the amplitude of the near-end signal is greater than the noise floor level.

17. The method of claim 16, wherein the noise floor level ranges between −50 dBm0 and −65 dBm0.

\* \* \* \* \*